A. C. DECKER.
CURRYCOMB.
APPLICATION FILED NOV. 7, 1913.
1,126,721.
Patented Feb. 2, 1915.
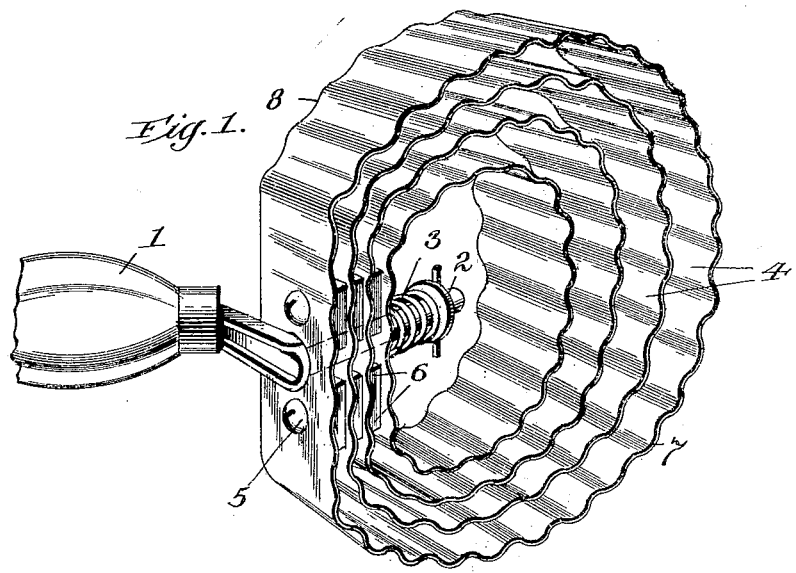
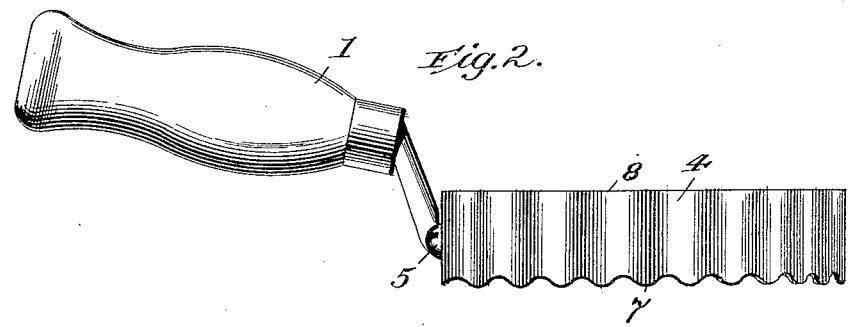
Inventor
Alexander C. Decker,

UNITED STATES PATENT OFFICE.

ALEXANDER C. DECKER, OF KEOKUK, IOWA.

CURRYCOMB.

1,126,721. Specification of Letters Patent. Patented Feb. 2, 1915.

Application filed November 7, 1913. Serial No. 799,768.

*To all whom it may concern:*

Be it known that I, ALEXANDER C. DECKER, a citizen of the United States, residing at Keokuk, in the county of Lee and State of Iowa, have invented certain new and useful Improvements in Currycombs, of which the following is a specification.

This invention relates to currycombs and particularly to the form of the tooth elements thereof.

The purpose of the invention is to provide an effective curry-comb devoid of all sharp points that might cut or scrape the animal on which the comb is used.

I illustrate the invention in the accompanying drawings in which:—

Figure 1 is a perspective view of a comb having my improved form of tooth; and Fig. 2 is a side elevation of the same.

In the drawings 1 represents the handle of my comb which is preferably made reversible in the manner described in my prior Patent #484,848, October 25, 1892, by mounting it on a swivel shank 2 with spring 3 and retaining lugs (not shown). The head of the comb consists of a plurality of D-shaped loops 4 formed from transversely corrugated strips of sheet steel or other suitable metal.

The loops 4 are of progressively increasing size and are nested as shown. They are connected together at one side by two bolts 5 and are there rigidly spaced apart by fiber or other blocks 6 interposed between them.

The edges of the loops 4 which form one working face of the comb are given a wavy configuration as shown at 7, while the other edge 8 may have any desired form of tooth or may, as shown in the drawing, be straight. When formed straight as shown the device may be used as a scraper.

By making the loops 4 of transversely corrugated strips I give to them a greatly increased flexibility in yielding to irregularities in the surface on which the comb is used, and produce a comb in which the entire effective surface may be constantly in action. Thus the use of corrugated strips in the free loop type of comb is a distinct advance, and furthermore permits the successful use of the wavy configuration of the edge in place of the usual fine teeth.

I am aware that heretofore corrugated strips having wavy edges have been used as the tooth elements in currycombs, but in the prior structures the tooth elements were not so mounted as to take advantage of the peculiar elasticity of the corrugated strips to permit individual yielding of the strips, and this feature is an important characteristic of my invention. In fact without such individual yielding of the strips the wavy edge is a relatively ineffective form of tooth, though otherwise highly desirable because of its gentle action.

Having thus described my invention, what I claim is:

1. A curry comb comprising in combination a plurality of flexible loops connected together at one side, said loops consisting of transversely corrugated strips of resilient sheet metal.

2. A curry comb comprising in combination a plurality of flexible loops connected together at one side, said loops consisting of transversely corrugated strips of resilient sheet metal having a wavy edge.

In testimony whereof I have signed my name to this specification in the presence of two subscribing witnesses.

ALEXANDER C. DECKER.

Witnesses:
JOHNSON B. ANGLE,
RALPH B. SMITH.

Copies of this patent may be obtained for five cents each, by addressing the "Commissioner of Patents, Washington, D. C."